United States Patent
Ohkawa et al.

(10) Patent No.: US 12,172,700 B2
(45) Date of Patent: *Dec. 24, 2024

(54) VEHICLE

(71) Applicants: TOYOTA JIDOSHA KABUSHIKI KAISHA, Aichi-ken (JP); SUBARU CORPORATION, Tokyo (JP)

(72) Inventors: Tohru Ohkawa, Toyota (JP); Hayato Morioka, Tokyo (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 216 days.

This patent is subject to a terminal disclaimer.

(21) Appl. No.: 17/690,006

(22) Filed: Mar. 9, 2022

(65) Prior Publication Data
US 2022/0315126 A1 Oct. 6, 2022

(30) Foreign Application Priority Data
Mar. 31, 2021 (JP) ................................. 2021-060483

(51) Int. Cl.
*B62D 25/14* (2006.01)
*B60H 1/00* (2006.01)
*B62D 1/19* (2006.01)

(52) U.S. Cl.
CPC ....... *B62D 25/142* (2013.01); *B60H 1/00564* (2013.01); *B62D 1/195* (2013.01); *B62D 25/145* (2013.01)

(58) Field of Classification Search
CPC .. B60H 1/0055; B60H 1/00564; B60K 35/70; B60K 37/00; B62D 25/14; B62D 25/142; B62D 25/145

USPC ............................................................. 296/70
See application file for complete search history.

(56) References Cited

U.S. PATENT DOCUMENTS

| | | |
|---|---|---|
| 5,354,114 A | 10/1994 | Kelman et al. |
| 6,250,678 B1 | 6/2001 | Yoshinaka et al. |
| 6,409,590 B1 | 6/2002 | Suzuki et al. |
| 6,582,011 B2 | 6/2003 | Palazzolo et al. |
| 6,912,863 B2 | 7/2005 | Tanaka et al. |
| 7,913,790 B2 * | 3/2011 | Tanaka ................... B60K 37/00 296/70 |

(Continued)

FOREIGN PATENT DOCUMENTS

| | | |
|---|---|---|
| FR | 2995864 A1 | 3/2014 |
| JP | H05-286458 A | 11/1993 |

(Continued)

OTHER PUBLICATIONS

Notice of Allowance in U.S. Appl. No. 17/673,013, mailed Jun. 12, 2024, 5pp.

(Continued)

*Primary Examiner* — Jason S Daniels
(74) *Attorney, Agent, or Firm* — HAUPTMAN HAM, LLP

(57) ABSTRACT

A vehicle includes a steering column connected to a steering wheel, a column cover that covers the steering column, and an air duct that is disposed inside an instrument panel and passes in front of the column cover. Buckling strength of the air duct in a vehicle body front-rear direction in front of the steering wheel is lower than buckling strength of the column cover in the vehicle body front-rear direction.

10 Claims, 4 Drawing Sheets

(56) References Cited

U.S. PATENT DOCUMENTS

| | | |
|---|---|---|
| 2004/0026903 A1 | 2/2004 | Abe |
| 2005/0217913 A1* | 10/2005 | Sakamoto .............. B62D 25/14 |
| | | 180/90 |
| 2005/0253409 A1 | 11/2005 | Sato et al. |
| 2007/0210616 A1 | 9/2007 | Wenzel et al. |
| 2009/0085338 A1 | 4/2009 | Tanaka et al. |
| 2014/0103685 A1* | 4/2014 | Mani .................... B62D 25/145 |
| | | 29/897.2 |
| 2016/0355145 A1 | 12/2016 | Forth et al. |
| 2016/0368520 A1* | 12/2016 | Earl ........................ B62D 1/11 |
| 2020/0047813 A1 | 2/2020 | Tanaka |
| 2021/0245602 A1 | 8/2021 | Tanaka et al. |
| 2022/0297625 A1 | 9/2022 | Yagishita |
| 2022/0314744 A1 | 10/2022 | Sakata et al. |

FOREIGN PATENT DOCUMENTS

| | | |
|---|---|---|
| JP | H06-286456 A | 10/1994 |
| JP | 2004-067024 A | 3/2004 |
| JP | 2009-083746 A | 4/2009 |
| JP | 2011-042254 A | 3/2011 |
| JP | 201660298 A | 4/2016 |
| JP | 202026218 A | 2/2020 |

OTHER PUBLICATIONS

Office Action in U.S. Appl. No. 17/673,013, mailed Mar. 18, 2024, 15pp.

U.S. Appl. No. 17/673,013, filed Feb. 16, 2022, 18pp.

\* cited by examiner

VEHICLE

CROSS-REFERENCE TO RELATED APPLICATION

This application claims priority to Japanese Patent Application No. 2021-060483 filed on Mar. 31, 2021, incorporated herein by reference in its entirety.

BACKGROUND

1. Technical Field

The technique disclosed herein relates to a vehicle. The technique disclosed herein specifically relates to a disposition of an air duct within an instrument panel of the vehicle.

2. Description of Related Art

A vehicle includes an instrument panel, an instrument panel reinforcement, and an air duct. The instrument panel is an interior component that hides a cable and an instrument panel reinforcement from the line of sight of an occupant in front of a driver's seat and a passenger seat. That is, the instrument panel is a cover that covers the cable and the instrument panel reinforcement. The instrument panel is also referred to as a dashboard.

The instrument panel reinforcement is a beam that connects right and left front pillars, and is a type of frame that supports strength of a vehicle body.

The air duct also passes inside the instrument panel. An air ejection outlet (register) is provided at an end of the instrument panel, and the air duct connects an air conditioner and the register. Japanese Unexamined Patent Application Publication No. 2016-60298 (JP 2016-60298 A) discloses a vehicle in which an air duct passes in front of an instrument panel reinforcement. Further, Japanese Unexamined Patent Application Publication No. 2020-26218 (JP 2020-26218 A) discloses a vehicle in which an air duct passes under a steering column. In the present specification, "front (rear)" means "front (rear)" in a front-rear direction of the vehicle body.

A steering wheel is located behind the instrument panel. The steering wheel is connected to the steering column. A column cover that covers the steering column is disposed between the instrument panel and the steering wheel.

SUMMARY

In the event of a collision, the driver may collide with a steering wheel and receive a strong impact. On the other hand, the air duct is a cylinder made of a thin plate, which is weaker in strength than the instrument panel reinforcement or the steering wheel. The present specification provides a technique of improving collision safety on a driver's seat side by devising disposition of an air duct which is a resin cylinder.

An aspect of the disclosure relates to a vehicle. The vehicle includes a steering column connected to a steering wheel, a column cover that covers the steering column, and an air duct that is disposed inside an instrument panel and passes in front of the column cover. Buckling strength of the air duct in a vehicle body front-rear direction in front of the steering wheel is lower than buckling strength of the column cover in the vehicle body front-rear direction. According to the above configuration, a driver collides with the steering wheel due to an impact of the collision, and the steering wheel and the column cover move forward. The column cover collides with the air duct. The air duct with the low buckling strength is crushed and the impact of the collision is mitigated. Collision safety on a driver's seat side is improved.

In the vehicle, a cross section of the air duct cut along a plane intersecting a vehicle width direction may be a polygon, and the maximum internal angle of the polygon may be located in a rear half of the air duct. According to the above configuration, a corner with a large internal angle is easily crushed. Alternatively, in the vehicle, the air duct may have a notch in a range overlapping the column cover when viewed from a front of a vehicle body. According to the above configuration, the air duct buckles starting from the notch. Alternatively, in the vehicle, a plate thickness of the air duct in a range overlapping the column cover may be thinner than a plate thickness of the air duct in a range not overlapping the column cover, when viewed from a front of the vehicle body. According to the above configuration, the buckling strength is also lowered by reducing the plate thickness.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
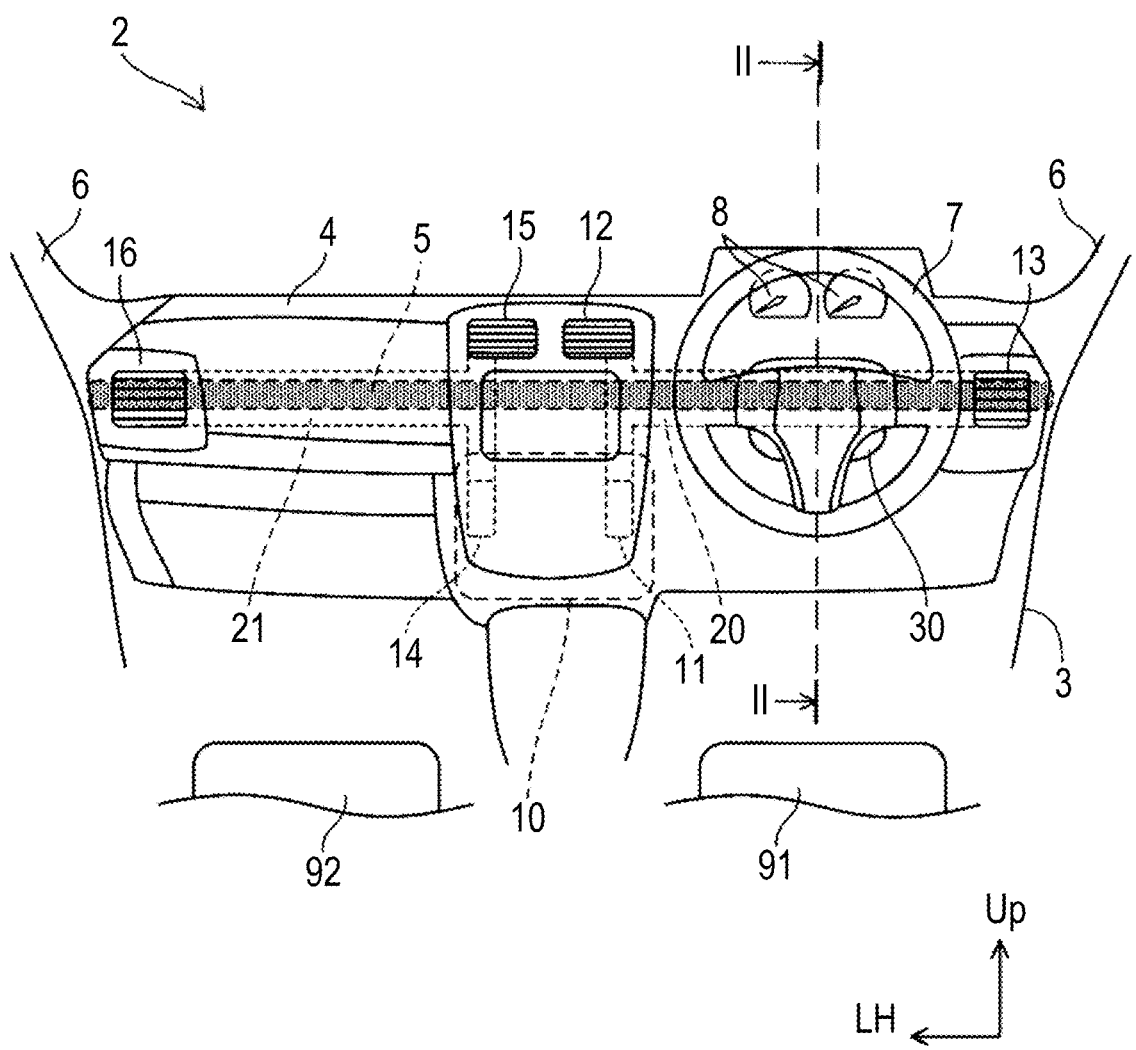
FIG. 1 is a front view of an instrument panel of a vehicle according to an embodiment.

A vehicle 2 of the embodiment will be described with reference to drawings. FIG. 1 shows a front view of an instrument panel 4 of the vehicle 2. Fr, Up, and LH of a coordinate system in the figure respectively mean a front, an upper side, and a left side of a vehicle body 3. A meaning of each axis in the coordinate system is the same in other figures. In the present specification, "front"/"rear"/"lateral" means a direction with respect to the vehicle body 3.

The instrument panel in a narrow sense means an instrument unit 8 in front of a driver's seat 91. However, the instrument panel 4 in the present specification means a component disposed between one end and the other end in a vehicle width direction at a front portion of a cabin of the vehicle body 3. That is, the instrument panel 4 means a component disposed in front of the driver's seat 91 and a passenger seat 92 and under a windshield. The instrument panel is also referred to as a dashboard. The instrument panel 4 is made of resin.

An instrument panel reinforcement 5 is disposed inside the instrument panel 4. In FIG. 1, the instrument panel reinforcement 5 is hatched in gray to aid understanding. The instrument panel reinforcement 5 is a beam extending in the vehicle width direction. The instrument panel reinforcement 5 is connected to each of a pair of front pillars 6. The instrument panel reinforcement 5 is a component belonging to a frame that supports strength of the vehicle body 3 to protect the cabin from impact of a collision. As described in detail below, the instrument panel reinforcement 5 supports a steering column connected to a steering wheel 7. Right in front of the steering wheel 7, a column cover 30 that covers the steering column is located.

An air conditioner 10 is disposed inside the instrument panel 4 and at substantially the center of the vehicle body 3 in the vehicle width direction. The air supplied from the air conditioner 10 is ejected from air ejection outlets 12, 13, 15, 16 provided on the instrument panel 4. The air ejection outlets 12, 15 provided at the center of the instrument panel 4 in the vehicle width direction are also referred to as center registers, and the air ejection outlets 13, 16 provided at the ends of the instrument panel 4 in the vehicle width direction are also referred to as side registers. The air conditioner 10 is provided with air outlets 11, 14. The air outlet 11 and the air ejection outlets 12, 13 on a driver's seat 91 side are connected by an air duct 20, and the air outlet 14 and the air ejection outlets 15, 16 on a passenger seat 92 side are connected by an air duct 21. The air ducts 20, 21 are disposed inside the instrument panel 4.

Figure 2:
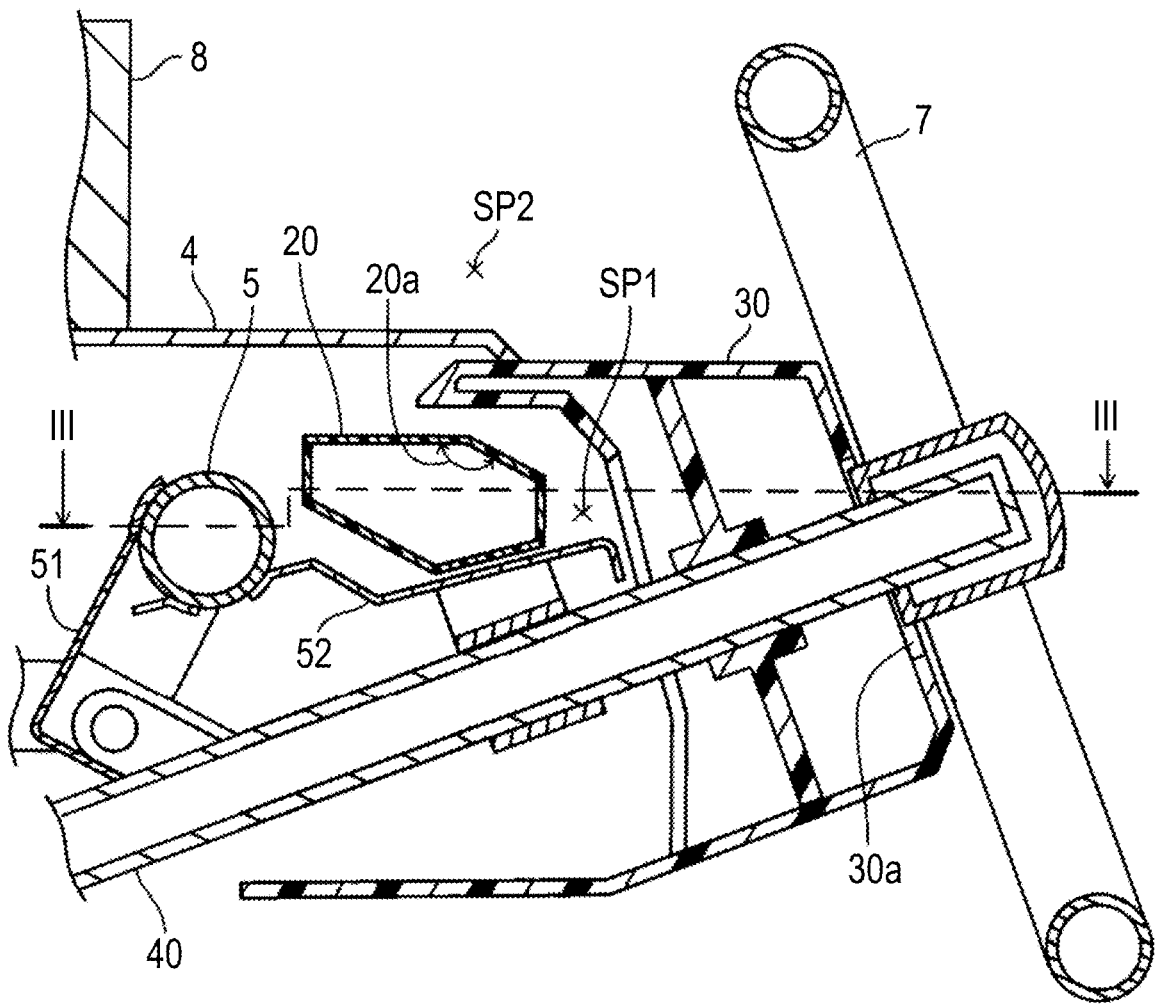
FIG. 2 is a cross-sectional view cut along a line II-II of FIG. 1.

A cross section along a line II-II of FIG. 1 is shown in FIG. 2. FIG. 2 shows a cross section of the vehicle body 3 cut along a plane orthogonal to an LH axis of the coordinate system in the figure and crossing a steering column 40. That is, FIG. 2 shows a cross section of the instrument panel 4 in front of the steering wheel 7. The steering column 40 is supported by the instrument panel reinforcement 5 through brackets 51, 52. Although a front portion of the bracket 51 is not shown in FIG. 2, the front portion of the bracket 51 is connected to the dash panel. The dash panel corresponds to a partition between a front compartment and the cabin.

The steering column 40 is a shaft that connects the steering wheel 7 and a steering gear box (not shown). The steering column 40 passes below the instrument panel reinforcement 5. The steering column 40 includes a rotating shaft that passes through an outer cylinder fixed to the brackets 51, 52 and is connected to the steering wheel 7. However, an internal structure of the steering column 40 is not shown in FIG. 2. The steering column 40 also has a tilt mechanism and an expansion and contraction mechanism, but these mechanisms are also not shown. The steering column 40 is also referred to as a steering post.

As described above, the column cover 30 covers the steering column 40 just in front of the steering wheel 7. The column cover 30 has a hole 30a through which the steering column 40 passes and covers the steering column 40 between the instrument panel 4 and the steering wheel 7. The air duct 20 is disposed in front of the column cover 30.

In front of the steering wheel 7, the air duct 20 extends in the vehicle width direction along the instrument panel reinforcement 5. In front of the steering wheel 7, the air duct 20 passes between the instrument panel reinforcement 5 and the steering wheel 7. That is, the air duct 20 passes behind the instrument panel reinforcement 5 along the vehicle width direction and passes in front of the steering wheel 7 and the column cover 30 along the vehicle width direction. The column cover 30 is located between the air duct 20 and the steering wheel 7. The column cover 30 is supported by the steering column 40. As described above, the steering column 40 includes the tilt mechanism (not shown). The column cover 30 moves together with the steering column 40.

When a vehicle collides, a driver collides with the steering wheel 7 and the column cover 30 is pushed forward together with the steering wheel 7. The air duct 20 is located just in front of the column cover 30, and the instrument panel reinforcement 5 is located just in front of the air duct 20. There is a space SP1 between the air duct 20 and the column cover 30. When the column cover 30 moves forward due to the impact of the collision, the column cover 30 collides with the air duct 20.

When the column cover 30 and the air duct 20 are stiff, the steering wheel 7 cannot move forward and large impact is applied to the driver. When at least one of the air duct 20 or the column cover 30 is soft, the air duct 20 or the column cover 30 is crushed by the collision with the steering wheel 7 and the impact applied to the driver is mitigated.

Both the column cover 30 and the air duct 20 are made of a thin resin plate. The column cover 30 is a cylinder with the shaft that is directed to a vehicle body front-rear direction, and the air duct 20 is a cylinder with the shaft that is directed to the vehicle width direction. The air duct 20 is more easily crushed in the vehicle body front-rear direction than the column cover 30. In front of the steering wheel 7, a shape and plate thickness of the air duct 20 are adjusted such that buckling strength of the air duct 20 in the vehicle body front-rear direction is lower than buckling strength of the column cover 30 in the vehicle body front-rear direction. The buckling strength is represented by a load when a load is applied to the air duct 20 (or column cover 30) in the vehicle body front-rear direction, the load is gradually increased, and the air duct 20 (or column cover 30) yields.

When the driver, the steering wheel 7, and the column cover 30 move forward due to the impact of the collision, the air duct 20 located between the column cover 30 and the instrument panel reinforcement 5 is crushed. With the crush of the air duct 20, the impact applied to the driver is mitigated. That is, collision safety on the driver's seat side is improved.

One of structures that reduce the buckling strength of the air duct 20 in the vehicle body front-rear direction will be described. As shown in FIG. 2, the cross section of the air duct 20 cut along the plane orthogonal to the vehicle width direction has a polygonal shape. A maximum internal angle 20a of the polygon is located in a rear half of the air duct 20. When the maximum internal angle 20a of the polygon is located in the rear half of the air duct 20, a corner having the maximum internal angle 20a of the polygon is likely to be crushed when the column cover 30 collides with the air duct 20 from behind. More preferably, the maximum internal angle 20a of the polygon of the cross section of the air duct 20 is located so as to face the column cover 30.

Another advantage is obtained by disposing the air duct 20 behind the instrument panel reinforcement 5, in front of the steering wheel 7. As shown in FIG. 2, a space SP2 is maintained above the air duct 20. Since the space SP2 is maintained above the air duct 20, the instrument unit 8 that displays a speed or the number of revolutions can be disposed in front of and above the instrument panel reinforcement 5. In FIG. 2, an internal structure of the instrument unit 8 is not shown. When the instrument unit 8 is disposed in front of and above the instrument panel reinforcement 5, a long distance can be maintained between driver's eyes and the instrument unit 8. Alternatively, another device can be disposed in the space SP2 above the air duct 20. With the disposition of the air duct 20 behind the instrument panel reinforcement 5, a degree of freedom in designing the front of the steering wheel 7 is increased.

Figure 3:
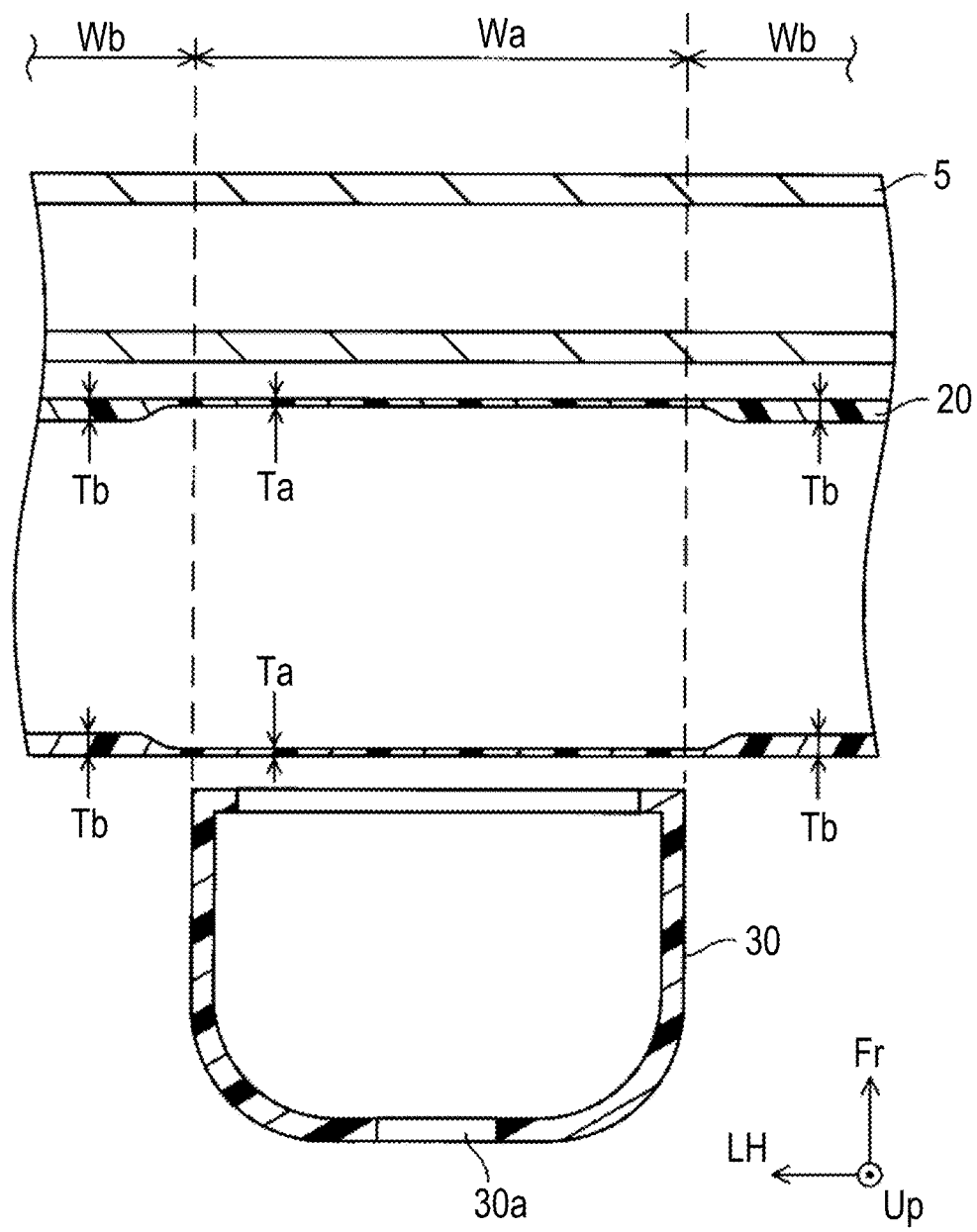
FIG. 3 is a cross-sectional view cut along a line of FIG. 2.

FIG. 3 shows a cross section taken along a line of FIG. 2. As described above, the column cover 30 is a cylinder having the hole 30a. Although the steering column 40 passes through the hole 30a, the steering column 40 and the steering wheel 7 are not shown in FIG. 3.

When the air duct 20 is viewed from the vehicle body front-rear direction (that is, when viewed along a direction of a Fr axis of the coordinate system in the figure), a plate thickness Ta in a region Wa overlapping the column cover 30 is thinner than a plate thickness Tb in a region Wb not overlapping the column cover 30. By thinning the plate thickness Ta of the air duct 20, the buckling strength of the air duct 20 in the vehicle body front-rear direction in front of the steering wheel 7 can be made lower than the buckling strength of the column cover 30 in the vehicle body front-rear direction. Even with employing at least one of the disposition of the maximum internal angle 20*a* of the polygon of the cross section of the air duct 20 in the rear half of the air duct 20 or the thinning of the plate thickness Ta, the buckling strength of the air duct 20 may be made lower than the buckling strength of the column cover 30.

Figure 4:
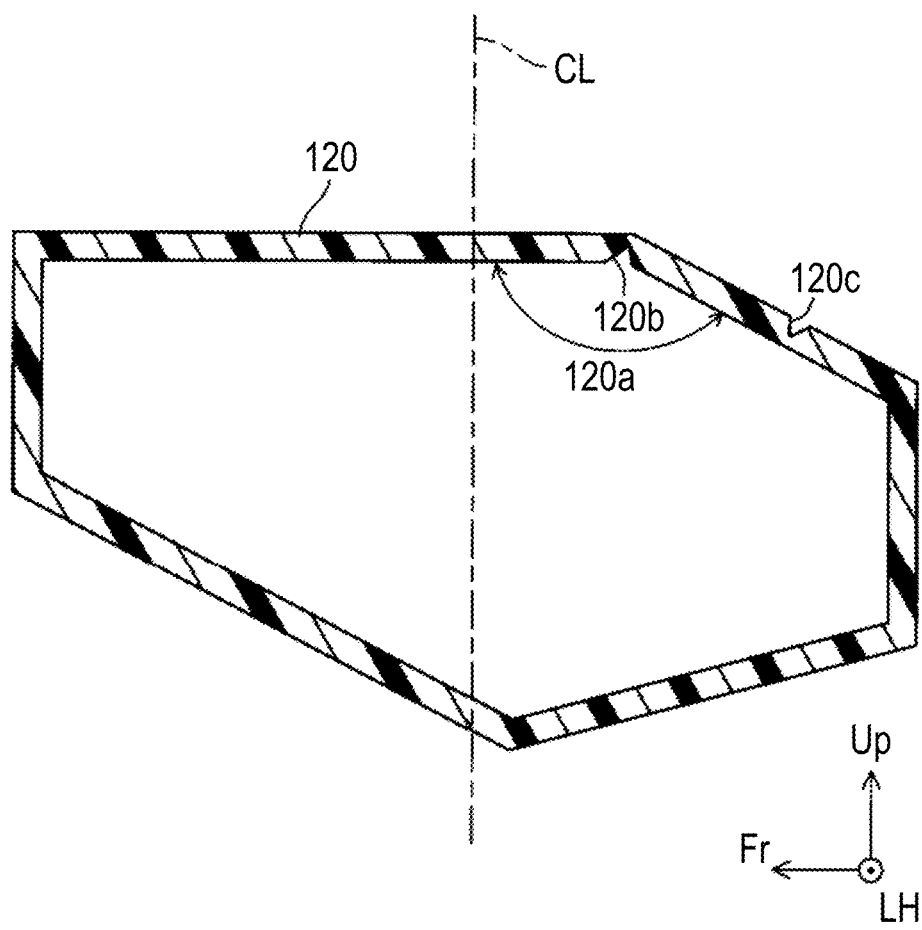
FIG. 4 is a cross-sectional view of an air duct of a modification example.

FIG. 4 shows a cross-sectional view of an air duct 120 of a modification example. FIG. 4 shows solely an air duct 120, but the instrument panel reinforcement 5 is located in front of the air duct 120 (in a Fr direction of the coordinate system in the figure) and the column cover 30 and the steering wheel 7 are located behind (direction opposite to the Fr axis of the coordinate system in the figure), as shown in FIG. 2. That is, FIG. 4 also shows a cross section of the air duct 120 in front of the steering wheel 7. The steering column 40 passes below the air duct 120 (direction opposite to an Up axis of the coordinate system in the figure).

A cross-sectional shape of the air duct 120 is the same as the cross-sectional shape of the air duct 20 of FIG. 2. An alternate long and short dash line CL in FIG. 4 represents the center of the air duct 120 in the vehicle body front-rear direction. The cross section of the air duct 120 has a polygonal shape, and a maximum internal angle 120*a* of the polygon is located in a rear half of the air duct 120 in the vehicle body front-rear direction. The air duct 120 has a notch 120*b* on the inside thereof and a notch 120*c* on the outside thereof. The notches 120*b*, 120*c* are provided in the air duct 120, in front of the steering wheel 7 (refer to FIG. 2).

The notches 120*b*, 120*c* are useful for making the buckling strength of the air duct 120 in the vehicle body front-rear direction in front of the steering wheel 7 lower than the buckling strength of the column cover 30 in the vehicle body front-rear direction. The notch 120*b* may be provided anywhere in the air duct 120, but more desirably provided on an inner surface of a corner having the maximum internal angle 120*a* of the polygon, as shown in FIG. 4. As shown in FIG. 4, a plurality of notches 120*b*, 120*c* may be provided in the air duct 120. The notch 120*c* is provided on an outer surface of the air duct 120.

Points to be noted regarding the techniques described in the embodiments will be described. The air ducts 20, 120 are often made of a thin resin plate, but may be made of a thin metal plate. The cross-sectional shapes of the air ducts 20, 120 in front of the steering wheel 7 may be any shape, but are polygonal desirably.

Although specific examples of the present disclosure have been described in detail above, the specific examples are merely examples and do not limit the scope of claims. The techniques described in the claims include various modifications and changes of the specific examples exemplified above. The technical elements described in the present specification or the drawings exhibit their technical usefulness alone or in various combinations and are not limited to the combinations described in the claims at the time of filing. The techniques exemplified in the present specification or the drawings may achieve a plurality of purposes simultaneously, and achieving one of the purposes itself has technical usefulness.

What is claimed is:

1. A vehicle comprising:
a steering column connected to a steering wheel;
a column cover that covers the steering column; and
an air duct that is disposed inside an instrument panel and passes in front of the column cover, wherein the air duct comprises: a first notch on an interior of the air duct, wherein buckling strength of the air duct in a vehicle body front-rear direction in front of the steering wheel is lower than buckling strength of the column cover in the vehicle body front-rear direction.

2. The vehicle according to claim 1, wherein a cross section of the air duct cut along a plane intersecting a vehicle width direction is a polygon, and a maximum internal angle of the polygon is located in a rear half of the air duct.

3. The vehicle according to claim 1, wherein the air duct has a notch in a range overlapping the column cover when viewed from a front of a vehicle body.

4. The vehicle according to claim 1, wherein a plate thickness of the air duct in a range overlapping the column cover is thinner than a plate thickness of the air duct in a range not overlapping the column cover, when viewed from a front of the vehicle body.

5. The vehicle according to claim 1, wherein the air duct further comprises:
a second notch on an exterior of the air duct.

6. The vehicle according to claim 1, wherein a maximum internal angle of the air duct is located at the first notch.

7. The vehicle according to claim 1, wherein the air duct comprises:
a first region having a first thickness; and
a second region having a second thickness greater than the first thickness, wherein the second region is spaced from the first region in a vehicle width direction.

8. The vehicle according to claim 7, wherein the first region overlaps with the column cover in the vehicle body front-rear direction.

9. The vehicle according to claim 7, wherein the air duct comprises a third region between the first region and the second region, and the third region has a variable thickness.

10. The vehicle according to claim 1, further comprising an instrument panel for displaying a speed of the vehicle, wherein the instrument panel is forward of the air duct in the vehicle body front-rear direction.

* * * * *